April 28, 1953  J. W. PICKING ET AL  2,637,007
BRAKING SYSTEM FOR ELECTRIC MOTORS
Filed March 22, 1947

INVENTOR.
Jay W. Picking
BY John L. Fuller
Hoodling and Krost
attys

Patented Apr. 28, 1953

2,637,007

UNITED STATES PATENT OFFICE 2,637,007

BRAKING SYSTEM FOR ELECTRIC MOTORS

Jay W. Picking and John L. Fuller, Cleveland, Ohio, assignors to The Reliance Electric & Engineering Company, a corporation of Ohio Application March 22, 1947, Serial No. 736,532

16 Claims. (Cl. 318—212)

Our invention relates in general to braking systems and more particularly to braking systems for alternating current induction motors.

An object of our invention is the provision of dynamic braking for an alternating current induction motor.

Another object of our invention is the provision of a braking system for an induction motor including a rectifier device inserted in a rearranged lead from the motor to an alternating current source.

Another object of our invention is the provision of a braking system for an induction motor including two rectifier devices, one inserted in each of two rearranged leads from the motor to an alternating current source.

Another object of our invention is a provision of a braking system for an induction motor including a rectifier device in series with an alternating current source and a reversedly connected motor primary leg.

Other objects and a fuller understanding of our invention may be had by referring to the following description and claims, taken in conjunction with the accompanying drawing, in which:

Prior art has established the effectiveness of direct current dynamic braking of alternating current induction motors. The use of this system has been limited in many cases due to the prohibitive cost of supplying the direct current power.

Figure 1:
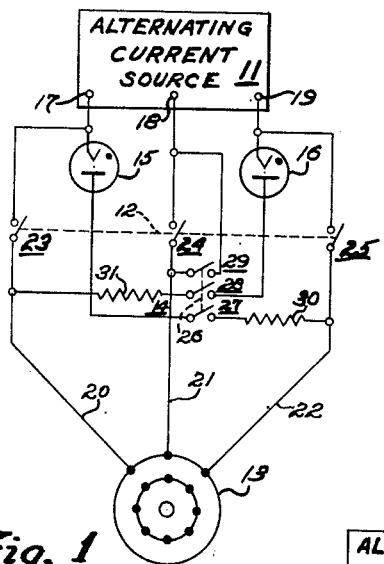
Figure 1 shows a schematic diagram of a braking system for a three-phase induction motor embodying our invention.

In our system, the direct current is rectified direct from the line, and by circuit means is caused to apply a braking torque to the motor. With reference to Figure 1, the preferred embodiment of our invention is shown in conjunction with a three-phase induction motor, although it is readily understood that our invention may take many forms and may be used with all types of induction motors regardless of type or the number of phases.

In Figure 1, an alternating current source 11 supplies power through a power switch 12 to an induction motor 13, to provide motoring torque to run the motor. The power switch 12 is disposed to open or close all leads to the motor 13. The alternating current source has a first, second and third output terminal with reference numbers 17, 18 and 19, respectively, and the induction motor 13 has first, second and third input leads with reference numbers 20, 21 and 22, respectively. The switch 12 has a first, second and third set of contacts with reference numbers 23, 24 and 25, respectively. The correspondingly numbered output terminals of the alternating current source 11 are adapted to be connected through the correspondingly numbered sets of contacts of the power switch 12 to the correspondingly numbered input leads of the motor 13, to provide power to run the motor 13.

A braking system 14 is arranged to apply braking torque to the motor 13. The braking system 14 includes a first rectifier device 15, a second rectifier device 16, a braking control switch 26, and a first and second resistor 30 and 31. The first and second rectifier devices 15 and 16 may be any suitable type of rectifier that will pass unidirectional current, and for the purpose we have illustrated gaseous discharge tubes, which have been found suitable to conduct the current required.

The braking control switch 26 has a first, second and third set of contacts with reference numbers 27, 28 and 29, respectively, and is disposed to render the braking system operative or inoperative. The first set of contacts 27 of the braking control switch 26 is adapted to connect the first rectifier device 15 between the first output terminal 17 of the alternating current source 11 and the third input lead 22 of the motor 13. The second set of contacts 28 of the braking control switch 26 is adapted to connect the second rectifier device 16 between the third output terminal 19 of the alternating current source 11 and the first input lead 20 of the motor 13. The third set of contacts 29 of the braking control switch 26 is adapted to reconnect the second output terminal 18 of the alternating current source 11 to the second input lead 21 of the motor 13. The first resistor 30 and the second resistor 31 are disposed in series combination with the respectively numbered rectifier devices to limit the current passed by these rectifier devices.

In operation, the power switch 12 may be closed to supply power from the alternating current source 11 to the motor 13, from which motoring torque is developed to run the motor 13. Upon opening the switch 12, power is thereupon removed from the motor 13, and to render the braking system operative, the braking control switch 26 may be closed. With the first and second rectifier devices 15 and 16 connected as shown in Figure 1, which polarity of connection is merely arbitrary and may be changed in any manner without departing from the scope of our invention, the current flow will be as follows: When the second output terminal 18 of the alternating current source 11 is positive with respect to the third output terminal 19 thereof, current will flow from the second output terminal 18 through the third set of contacts 29 of the braking control switch 26 to the second input lead 21 of the motor 13, through the internal connections of the motor 13 to the first input lead 20 thereof, then through the second resistor 31 to the second set of contacts 28 of the braking control switch 26, through the second rectifier device 16, and then returned to the third output terminal 19 of the alternating current source 11. When the second output terminal 18 of the alternating current source 11 is positive with respect to the first output terminal 17 thereof, current will flow from this second output terminal 18 through the third set of contacts 29 of the braking control switch 26 to the second input lead 21 of the motor 11, then through the internal connections of the motor 13 to the third input lead 22 thereof, then flow through the first resistor 30 to the first set of contacts 27 of the braking control switch 26, through the first rectifier device 15, and then return to the first output terminal 17 of the alternating current source 11.

With this particular form of our invention, the rectified current from the output of the first and second rectifier devices is applied to the motor 13 by reversed connections, which causes pulses of the half-wave rectified current to flow through the internal connections of the motor 13 in reverse phase sequence to that which would exist when the motor is connected to the alternating current source 11 to obtain power for running the motor 13. Our theory of operation of this braking cycle is that at the beginning of the braking cycle "plugging" is initiated causing a high net braking torque in this region and at lower speed a high torque due to dynamic braking is obtained. Using this principle of operation of our invention, rectified current is caused to flow in reverse phase sequence through one or more of the legs of the primary winding of the induction motor 13 during at least a part of the alternating current cycle, and this, we feel, is the reason that braking torque is obtained to brake the motor 13. Regardless of the theory of operation, we have actually built a braking system of this type and have found from actual operation that braking torque is obtained from synchronous speed to zero speed.

Figure 2:
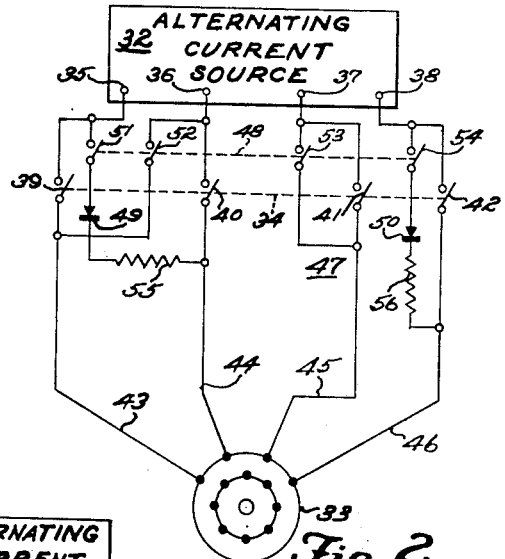
Figure 2 shows a schematic diagram of a braking system for a two phase four wire induction motor.

In Figure 2, a form of our invention is utilized in conjunction with a two phase four wire induction motor. A two phase four wire alternating current source 32 supplies power to the two-phase motor 33 through a power switch 34. The alternating current source 32 has first, second, third and fourth terminals 35, 36, 37 and 38 respectively. The power switch 34 has first, second, third and fourth sets of contacts 39, 40, 41 and 42, respectively. The induction motor 33 has first, second, third and fourth input leads 43, 44, 45 and 46, respectively. The contacts of the power switch 34 are adapted to connect the correspondingly numbered terminals of the source 32 to the correspondingly numbered leads of the motor 33. A braking system 47 for the motor 33 includes a braking control switch 48, a first rectifier device 49 and a second rectifier device 50. The braking control switch 48 has first, second, third and fourth sets of contacts 51, 52, 53 and 54, respectively. First and second current limiting resistors 55 and 56 are serially connected in conjunction with the first and second rectifier devices 49 and 50, respectively. The first rectifier device 49 and the first current limiting resistor 55 are arranged to be serially connected between the first terminal 35 of the alternating current source 32 and the second input lead 44 of the induction motor 33 by the first set of contacts 51 of the braking control switch 48. The second set of contacts 52 of the braking control switch 48 is adapted to connect the second terminal 36 to the first input lead 43. The third set of contacts 53 of the braking control switch 48 is adapted to connect the third terminal 37 to the third motor input lead 45. The fourth set of contacts 54 of the braking control switch 48 is adapted to serially connect the second rectifier device 50 and the second current limiting resistance 56 between the fourth terminal 38 and the fourth motor input lead 46.

In operation, the induction motor 33 may be caused to run, in a similar fashion to the operation of the circuit of Figure 1, by closing the power switch 34. Upon opening the power switch 34, the motor 33 is removed from the power source, and thereupon the braking control switch 48 may be closed to render the braking system 47 operative. The braking system 47 is rendered operative when the braking control switch 48 is closed, because rectified half-wave current is supplied in reverse phase sequence to the induction motor 33. When the braking control switch 48 is closed, the current flow will be as follows: When the first output terminal 35 of the alternating current source 32 is positive with respect to the second terminal 36 thereof, current will flow from the first terminal 35 through the first set of contacts 51, through the first rectifier device 49, through the first current limiting resistance 55 through the motor input lead 44, through the internal connections of the motor 33 to the first input lead 43, through the second set of contacts 52 to return to the second terminal 36 of the alternating current source 32. When the fourth terminal 38 of the alternating current source 32 is positive with respect to the third terminal 37 thereof, current will flow from the fourth terminal 38 through the fourth set of contacts 54, through the second rectifier device 50, through the second current limiting resistance 56, through the fourth motor input lead 46, through the internal connections of the motor 33 to the third motor input lead 45, to the third set of contacts 53, and return to the third terminal 37 of the alternating current source 32. The theory of operation of this form of our invention is substantially the same as that for the circuit shown in Figure 1, in that rectified half-wave current pulses are caused to flow through the primary windings of the motor 33 in reverse phase sequence to that which exists under current causing a motoring torque.

Figure 3:
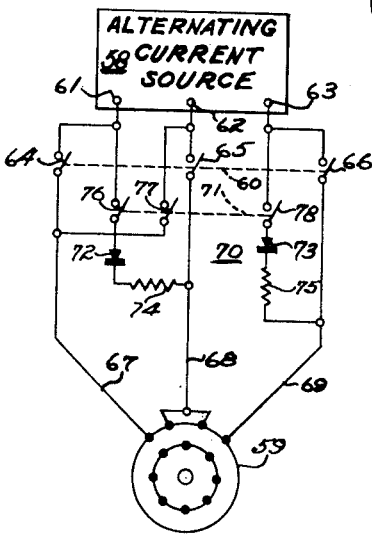
Figure 3 shows a braking system for a two phase three wire induction motor.

Figure 3 shows a further embodiment of our invention wherein an alternating current source 58 supplies power to a two phase three wire induction motor 59 through a power switch 60. The alternating current source 58 has first, second and third output terminals 61, 62 and 63, respectively, the power switch 60 has first, second and third contacts 64, 65 and 66, respectively, which control the flow of current to first, second and third input leads 67, 68 and 69, respectively, of the induction motor 59. A braking system 70 includes a braking control switch 71, a first and a second rectifier device 72 and 73, respectively, and first and second current limiting resistors 74 and 75 respectively. The braking control switch 71 has first, second, and third sets of contacts 76, 77 and 78 respectively. The braking control switch 71 is designed to connect the first rectifier device 72 with its associated current limiting resistor 74 in series with two reversedly connected input leads 67 and 68, and to connect the second rectifier device 73 in series with its current limiting resistor 75 in series in the third input lead 69. When the power switch 60 is open, the braking control switch 71 may be closed to render the braking system 70 operative, the braking system supplying half-wave pulses of current in a reverse phase sequence to one leg of the two-phase motor, with half-wave pulses of current being supplied to the other leg of the motor 59 in an in-phase relationship.

In all three circuits, it is to be understood that the braking control switches of the various circuits should be opened after the motor comes to rest to prevent rectified alternating current from flowing through the windings of the induction motor. It will also be apparent to those skilled in the art that circuits embodying our invention may be applied to polyphase motors of any number of phases, or various combinations of the two modifications shown.

Although we have described our invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In an induction motor having at least two input leads, the provision of a braking system to brake the said motor, the said motor being connected to an alternating current source to provide power to run the said motor, the said braking system including means for disconnecting the said motor from the said alternating current source, two rectifier devices, means for rearrangedly connecting at least two of the said motor input leads to said alternating current source, means for connecting one rectifier device in each of two rearrangedly connected motor input leads, and means for providing an electrical path for the return of rectified current to the said alternating current source.

2. In an induction motor having a primary winding with at least one leg, the said primary winding adapted to be connected to an alternating current source to provide power to run the said motor, the provision of a braking system including means to disconnect said primary winding from said alternating current source, means to reversedly connect at least one leg to said alternating current source, a rectifier device, and means to connect said rectifier device in series combination with one of said reversedly connected legs.

3. In an induction motor having a primary winding, the said primary winding having at least two legs adapted to be connected in series arrangement to an alternating current source to provide power to run the said motor, the provision of a braking system including means for disconnecting said primary winding from said alternating current source, a rectifier device, means for reversedly connecting at least one leg to said alternating current source, and means for connecting said rectifier device in series arrangement with said reversedly connected leg.

4. In a control system for a three-phase induction motor, the provision of a braking system, said motor and said braking system adapted to be energized from a three-phase source, the said motor having at least first, second and third input leads, the said motor input leads being adapted to be connected respectively to first, second and third output terminals of the said three-phase source to run the said motor, the said braking system including a first rectifier device, a second rectifier device, first contact means adapted to connect said first rectifier device to pass unidirectional current between the first source output terminal and the second motor input lead, second contact means adapted to connect said second rectifier device to pass unidirectional current between the second source output terminal and the first motor input lead, and means to render said braking system operative including means to disconnect said motor leads from said source terminals, means to close said first and second contact means, and means to connect said third motor input lead to said third source output terminal.

5. In a control system for a two-phase induction motor, the provision of a braking system, said motor and said braking system being energized from a two-phase source, the said motor having at least first, second and third input leads, the said motor input leads being adapted to be connected respectively to first, second and third output terminals of the said source to run the said motor, the said braking system including a first rectifier device, a second rectifier device, first contact means adapted to connect said first rectifier device to pass unidirectional current between the first source output terminal and the second motor input lead, second contact means adapted to connect said second rectifier device to pass unidirectional current between the third source output terminal and the third motor input lead, and means to render said braking system operative including means to disconnect said motor leads from said source terminals, means to close said first and second contact means, and means to connect said first motor input lead to said second source output terminal.

6. In a control system for a two-phase three-wire induction motor, the provision of a braking system, said motor and said braking system being energized from a two-phase three-wire source, the said motor having first, second and third input leads, the said motor input leads being adapted to be connected respectively to first, second and third output terminals of the said source to run the said motor, the said braking system including a first rectifier device, a second rectifier device, first contact means adapted to connect said first rectifier device to pass unidirectional current between the first source output terminal and the second motor input lead, second contact means adapted to connect said second rectifier device to pass unidirectional current between the third source output terminal and the third motor input lead, and means to render said braking system operative including means to disconnect said motor leads from said source terminals, means to close said first and second contact means, and means to connect said first motor input lead to said second source output terminal.

7. In a control system for a two-phase four-wire induction motor, the provision of a braking system, said motor and said braking system being energized from a two-phase four-wire source, the said motor having first, second, third and fourth input leads, the said first and second leads being connected to one of said two-phase windings, and the said third and fourth leads being connected to the other of said two-phase windings, the said motor input leads being adapted to be connected respectively to first, second, third and fourth output terminals of the said source to run the said motor, the said braking system including a first rectifier device, a second rectifier device, first contact means adapted to connect said first rectifier device to pass unidirectional current between the first source output terminal and the second motor input lead, second contact means adapted to connect said second rectifier device to pass unidirectional current between the third source output terminal and the third motor input lead, third contact means adapted to connect said second source terminal to said first input lead, fourth contact means adapted to connect said fourth source terminal to said fourth input lead, and means to render said braking system operative including means to disconnect said motor leads from said source terminals, and means to close said contact means.

8. In an induction motor having at least one input lead, the provision of a braking system to brake the said motor, the said motor adapted to be connected to an alternating current source to provide power to run the said motor, the said braking system including means for disconnecting the said motor from the said alternating current source, means for rearrangedly connecting at least one of the said motor input leads to said alternating current source, a two-terminal rectifier device, means for connecting said two terminals of said rectifier device in series arrangement in one of said rearrangedly connected motor input leads, and means for providing an electrical path for the return of rectified current to the said alternating current source.

9. In an induction motor having a primary winding with at least one leg, the said primary winding being connected to an alternating current source to provide power to run the said motor, the provision of a braking system including means to disconnect said primary winding from said alternating current source, means to reversedly connect at least one leg to said alternating current source, a two-terminal rectifier device, and means to connect said two terminals of said rectifier device in series combination with one of said reversedly connected legs.

10. In a three-phase induction motor having a primary winding with motor leads one, two and three adapted to be connected, respectively, to power leads A, B and C of a three-phase alternating current source, the provision of a braking system for said motor including two two-terminal rectifier devices, means to disconnect motor leads one and two from power leads A and B, and means to connect one two-terminal rectifier device in series relation with motor lead one and power lead B and to connect the second two-terminal rectifier device in series relation with motor lead two and power lead A.

11. In a two-phase four-wire induction motor having a primary winding with motor leads one, two, three and four adapted to be connected, respectively, to power leads A, B, C and D of a two-phase four-wire alternating current source, the provision of a braking system for said motor including two two-terminal rectifier devices, means to disconnect motor leads one, two and three from power leads A, B, and C, means to connect one two-terminal rectifier device in series relation with motor lead one and power lead A, means to connect motor lead two to power lead C, and means to connect the second two-terminal rectifier device in series relation with motor lead three and power lead B.

12. In a two-phase three-wire induction motor having a primary winding with motor leads one, two and three adapted to be connected, respectively, to power leads A, B and C of a two-phase three-wire alternating current source, the provision of a braking system for said motor including two two-terminal rectifier devices, means to disconnect motor leads one, two and three from power leads A, B and C, means to connect one two-terminal rectifier device in series relation with motor lead one and power lead A, means to connect motor lead two to power lead C, and means to connect the second two-terminal rectifier device in series relation with motor lead three and power lead B.

13. The combination, with a polyphase power supply and an alternating current electric motor, of a control and braking system comprising means for connecting the windings of said motor in circuit with the respective phases of said power supply, a rectifier connected in circuit with one of said windings and one phase of said power supply, a second rectifier connected in circuit with another of said windings and a second phase of said power supply, said rectifier circuits being connected in phase opposition with the corresponding power supply circuits, and means for selectively energizing said power supply circuit and said rectifier circuits.

14. The combination, with a three phase power supply and an alternating current electric motor, of a control and braking system comprising switching means for connecting the windings of said motor in circuit with the respective leads of said power supply, a pair of braking circuits including connections reversed in phase relative to the connections made by said switching means between two of said windings and the leads of said power supply, a rectifier in each of said braking circuits, and control means for energizing and deenergizing said braking circuits.

15. The method of operating a polyphase electric motor having symmetrically distributed polyphase windings which consists in applying polyphase current, during an operating cycle, to the motor windings so that an equal phase difference exists between the currents in successive windings, and thereafter, during a braking cycle, interchanging the phases of the currents supplied to at least two of said windings while rectifying the last-mentioned currents.

16. The method of operating a three phase electric motor having symmetrically distributed windings which consists in applying three phase current, during an operating cycle, to the motor windings so that an equal phase difference exists between the currents in successive windings, and thereafter, during a braking cycle, interchanging the phases of the currents supplied to two of said windings while rectifying the last-mentioned currents to provide pulsating direct braking currents.

JAY W. PICKING.
JOHN L. FULLER.

References Cited in the file of this patent

UNITED STATES PATENTS

| Number | Name | Date |
| --- | --- | --- |
| 862,168 | James | Aug. 6, 1907 |
| 1,911,356 | Eames | May 30, 1933 |

FOREIGN PATENTS

| Number | Country | Date |
| --- | --- | --- |
| 441,717 | Great Britain | Jan. 24, 1936 |
| 428,810 | France | Jan. 30, 1911 |
| 648,478 | Germany | July 15, 1937 |